United States Patent
Lee et al.

(10) Patent No.: US 10,263,680 B2
(45) Date of Patent: Apr. 16, 2019

(54) METHOD AND APPARATUS FOR GENERATING FEEDBACK IN A COMMUNICATION SYSTEM

(71) Applicant: Samsung Electronics Co., Ltd., Gyeonggi-do (KR)

(72) Inventors: Hyo-Jin Lee, Gyeonggi-do (KR); Youn-Sun Kim, Gyeonggi-do (KR); Ju-Ho Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/831,363

(22) Filed: Aug. 20, 2015

(65) Prior Publication Data

US 2015/0358065 A1    Dec. 10, 2015

Related U.S. Application Data

(63) Continuation of application No. 13/646,164, filed on Oct. 5, 2012, now Pat. No. 9,124,398.

(30) Foreign Application Priority Data

Oct. 6, 2011 (KR) .................. 10-2011-0102118

(51) Int. Cl.
*H04B 7/06* (2006.01)
*H04L 25/00* (2006.01)
(Continued)

(52) U.S. Cl.
CPC ......... *H04B 7/0626* (2013.01); *H04B 7/0417* (2013.01); *H04B 7/0632* (2013.01);
(Continued)

(58) Field of Classification Search
None
See application file for complete search history.

(56) References Cited

U.S. PATENT DOCUMENTS

| | | | |
|---|---|---|---|
| 2002/0072384 A1 | 6/2002 | Chheda | |
| 2003/0129989 A1* | 7/2003 | Gholmieh | H04L 1/0066 455/452.1 |

(Continued)

FOREIGN PATENT DOCUMENTS

| | | |
|---|---|---|
| CN | 101282564 | 10/2008 |
| CN | 101340219 | 1/2009 |

(Continued)

OTHER PUBLICATIONS

Samsung, "Full Buffer Evaluation Results for CoMP Scenarios 3 and 4", R1-112709, 3GPP TSG RAN WG1 Meeting #66, Aug. 22-26, 2011, 6 pages.

(Continued)

*Primary Examiner* — Jenee Holland
(74) *Attorney, Agent, or Firm* — The Farrell Law Firm, P.C.

(57) ABSTRACT

Methods and apparatuses are provided for reporting channel status by a user equipment (UE) in a communication system. Information on at least one channel status information reference signal is received from an evolved node B. A first channel status based on a first period and a first set of the at least one channel status information reference signal, is reported to the evolved node B. A second channel status based on a second period and a second set of the at least one channel status information reference signal, is reported to the evolved node B. The first channel status includes at least one of a precoding matrix indicator (PMI), a channel quality indicator (CQI), and a ranking indication (RI), and the second channel status includes at least one of a CQI, a PMI and a RI. The RI of the second channel status is same as the RI of the first channel status.

12 Claims, 6 Drawing Sheets

(51) Int. Cl.
*H04L 5/00* (2006.01)
*H04B 7/0417* (2017.01)

(52) U.S. Cl.
CPC ......... *H04B 7/0639* (2013.01); *H04L 5/0032* (2013.01); *H04L 5/0053* (2013.01); *H04L 5/0057* (2013.01); *H04L 25/00* (2013.01)

(56) References Cited

U.S. PATENT DOCUMENTS

| | | | |
|---|---|---|---|
| 2005/0191965 A1* | 9/2005 | Yu | H04L 1/0026 455/67.16 |
| 2007/0191024 A1* | 8/2007 | Kim | H04L 1/0003 455/456.2 |
| 2007/0211656 A1* | 9/2007 | Kwak | H04L 1/1664 370/319 |
| 2008/0019279 A1* | 1/2008 | Kim | H04L 1/0061 370/241 |
| 2008/0039094 A1 | 2/2008 | Jeong et al. | |
| 2008/0069053 A1 | 3/2008 | Kim et al. | |
| 2008/0130588 A1 | 6/2008 | Jeong et al. | |
| 2008/0214193 A1 | 9/2008 | Jeong et al. | |
| 2008/0232323 A1* | 9/2008 | Jeong | H04W 72/0406 370/331 |
| 2008/0268844 A1 | 10/2008 | Ma et al. | |
| 2009/0296850 A1* | 12/2009 | Xu | H03M 13/136 375/295 |
| 2010/0239036 A1 | 9/2010 | Koo et al. | |
| 2010/0246512 A1* | 9/2010 | Kawamura | H04L 1/0026 370/329 |
| 2010/0254274 A1 | 10/2010 | Westerberg et al. | |
| 2010/0316000 A1 | 12/2010 | Burbidge et al. | |
| 2010/0322351 A1 | 12/2010 | Tang et al. | |
| 2010/0325267 A1 | 12/2010 | Mishra et al. | |
| 2011/0037601 A1 | 2/2011 | Kumar et al. | |
| 2011/0044284 A1 | 2/2011 | Voltolina et al. | |
| 2011/0080968 A1* | 4/2011 | Seo | H04B 7/0417 375/267 |
| 2011/0141987 A1* | 6/2011 | Nam | H04L 1/0003 370/329 |
| 2011/0194551 A1* | 8/2011 | Lee | H04B 7/0626 370/342 |
| 2011/0199986 A1 | 8/2011 | Fong et al. | |
| 2011/0216713 A1* | 9/2011 | Kim | H04L 5/0053 370/329 |
| 2011/0244877 A1 | 10/2011 | Farajidana et al. | |
| 2011/0269459 A1 | 11/2011 | Koo et al. | |
| 2011/0292847 A1* | 12/2011 | Yoon | H04L 5/0007 370/280 |
| 2011/0317614 A1 | 12/2011 | Park et al. | |
| 2012/0015657 A1 | 1/2012 | Comsa et al. | |
| 2012/0033608 A1* | 2/2012 | Seo | H04B 7/2606 370/315 |
| 2012/0039220 A1* | 2/2012 | Chen | H04L 5/0053 370/279 |
| 2012/0046033 A1 | 2/2012 | Ko et al. | |
| 2012/0058791 A1 | 3/2012 | Bhattad et al. | |
| 2012/0076023 A1* | 3/2012 | Ko | H04B 7/0486 370/252 |
| 2012/0076028 A1* | 3/2012 | Ko | H04L 1/0026 370/252 |
| 2012/0113816 A1 | 5/2012 | Bhattad et al. | |
| 2012/0120842 A1 | 5/2012 | Kim et al. | |
| 2012/0120891 A1* | 5/2012 | Mazzarese | H04W 72/042 370/329 |
| 2012/0201163 A1* | 8/2012 | Jongren | H04W 24/10 370/252 |
| 2012/0207105 A1* | 8/2012 | Geirhofer | H04L 5/0032 370/329 |
| 2012/0287799 A1* | 11/2012 | Chen | H04B 7/024 370/252 |
| 2012/0307649 A1* | 12/2012 | Park | H04B 7/0413 370/241 |
| 2012/0320766 A1 | 12/2012 | Sridhar | |
| 2013/0010707 A1* | 1/2013 | Gaal | H04L 5/003 370/329 |
| 2013/0017825 A1* | 1/2013 | Li | H04L 1/0029 455/425 |
| 2013/0021925 A1* | 1/2013 | Yin | H04B 7/024 370/252 |
| 2013/0021926 A1 | 1/2013 | Geirhofer et al. | |
| 2013/0029657 A1* | 1/2013 | Gao | H04W 74/004 455/422.1 |
| 2013/0044685 A1* | 2/2013 | Fong | H04J 11/0053 370/328 |
| 2013/0077581 A1* | 3/2013 | Lee | H04L 25/0204 370/329 |
| 2013/0088984 A1* | 4/2013 | Lee | H04L 5/0053 370/252 |
| 2013/0148533 A1 | 6/2013 | Li et al. | |
| 2013/0194950 A1* | 8/2013 | Haghighat | H04W 24/02 370/252 |
| 2013/0258992 A1* | 10/2013 | Seo | H04L 1/0026 370/329 |
| 2014/0044044 A1* | 2/2014 | Josiam | H04W 24/10 370/328 |
| 2014/0066116 A1 | 3/2014 | Gao et al. | |
| 2014/0087736 A1 | 3/2014 | Shoshan et al. | |
| 2014/0315563 A1* | 10/2014 | Guo | H04L 1/0026 455/450 |
| 2015/0085750 A1* | 3/2015 | Zhang | H04L 1/0031 370/328 |
| 2015/0117380 A1* | 4/2015 | Zhang | H04W 24/10 370/329 |
| 2015/0195071 A1* | 7/2015 | Lunttila | H04L 5/0053 370/329 |

FOREIGN PATENT DOCUMENTS

| | | |
|---|---|---|
| CN | 101867457 | 10/2010 |
| CN | 102149124 | 8/2011 |
| EP | 2 584 822 | 4/2013 |
| EP | 2 676 395 | 12/2013 |
| WO | WO 2010/079926 | 7/2010 |
| WO | WO 2010/123295 | 10/2010 |
| WO | WO 2010/145548 | 12/2010 |
| WO | WO 2012/112281 | 8/2012 |

OTHER PUBLICATIONS

Motorola Mobility, "Coordinated Scheduling (CS) Schemes with Low Power RRH: Details and Phase-2 Evaluations Results", R1-112441, 3GPP TSG RAN 1 #66, Aug. 22-26, 2011, 8 pps.
Chinese Office Action dated Apr. 25, 2016 issued in counterpart application No. 201280049101.7, 8 pages.
Japanese Office Action dated May 30, 2016 issued in counterpart application No. 2014-534479, 9 pages.
European Search Report dated Apr. 26, 2017 issued in counterpart application No. 12187481.2-1875, 11 pages.
European Search Report dated Jul. 2, 2018 issued in counterpart application No. 18160734.2-1219, 8 pages.
Samsung, "Clarification on the Assumption of Feedback Information in PUCCH Mode 2-1", R1-113485, 3GPP TSG-RAN1 WG1 Meeting #66bis, Oct. 10-14, 2011, 4 pages.
Huawei, "Double Codebook Based Differential Feedback for MU-MIMO Enhancement", R1-103449, 3GPP TSG RAN WG1 meeting #61bis, Jun. 28-Jul. 2, 2010, 10 pages.
Korean Office Action dated Jan. 30, 2018 issued in counterpart application No. 10-2011-0102118, 7 pages.

* cited by examiner

METHOD AND APPARATUS FOR GENERATING FEEDBACK IN A COMMUNICATION SYSTEM

PRIORITY

This application is a Continuation application of U.S. application Ser. No. 13/646,164, filed in the U.S. Patent and Trademark Office on Oct. 5, 2012, which claims priority under 35 U.S.C. § 119(a) to Korean Patent Application Serial No. 10-2011-0102118, which was filed in the Korean Intellectual Property Office on Oct. 6, 2011, the entire disclosure of which is incorporated herein by reference.

BACKGROUND OF THE INVENTION

1. Field of the Invention

The present invention relates to a method and apparatus for generating feedback in a Cooperative Multi-Point (CoMP) system in which a plurality of Base Stations (BSs) (or Evolved Node Bs (ENBs)) cooperatively support downlink transmission for a terminal (or User Equipment (UE)).

2. Description of the Related Art

A variety of mobile communication standards, such as $3^{rd}$ Generation Partnership Project (3GPP) High Speed Downlink Packet Access (HSDPA), 3GPP High Speed Uplink Packet Access (HSUPA), Long Term Evolution (LTE), Long Term Evolution-Advanced (LTE-A), 3GPP2 High Rate Packet Data (HRPD), and Institute of Electrical and Electronics Engineers (IEEE) 802.16, have been developed to support high-speed, high-quality wireless packet data transmission services.

An LTE system maximizes a capacity of a wireless system using a variety of wireless access technologies. An LTE-A system, which evolved from the LTE system, improves data transmission capability compared to the LTE system.

The existing $3^{rd}$ Generation (3G) wireless packet data communication systems, such as HSDPA, HSUPA and HRPD, use technologies such as Adaptive Modulation and Coding (AMC) and a channel-sensitive scheduling, which improve transmission efficiency. AMC and channel-sensitive scheduling may receive feedback, e.g., partial channel status information from a receiver, and apply an appropriate modulation and coding scheme at the time that is determined to be most efficient.

In a wireless packet data communication system to which AMC is applied, a transmitter may adjust an amount of its transmission data depending on the channel status. More specifically, if the channel status is poor, the transmitter reduces the amount of transmission data to set the receive error probability to a desired level. However, if the channel status is good, the transmitter increases the amount of transmission data to efficiently transmit more information while setting the receive error probability to the desired level.

In a wireless packet data communication system to which channel-sensitive scheduling is applied, a transmitter selectively serves a user having an excellent channel status among multiple users, so the system capacity increases, compared to allocating a channel to one user and serving the user. This capacity increase is often referred to as "multi-user diversity gain." When used together with a Multiple Input Multiple Output (MIMO) transmission scheme, AMC may also include a function of determining a number of or ranks of spatial layers for transmission signals. In this case, the wireless packet data communication system, to which AMC is applied, also considers the number of layers on which it will transmit data using MIMO, without simply considering only the modulation scheme and coding rate, in determining the optimal data rate. Generally, Orthogonal Frequency Division Multiple Access (OFDMA) contributes to an increase in capacity, compared to Code Division Multiple Access (CDMA). One of the several causes of contributing to an increase in the capacity is that OFDMA can perform frequency domain scheduling. Basically, capacity gain is obtained by the channel-sensitive scheduling method based on the time-varying characteristics of channels, and additional capacity gain can be obtained by utilizing the frequency-dependent characteristics of channels. Accordingly, many studies have been conducted to switch CDMA, i.e., a multiple access scheme that has been used in the 2G and 3G mobile communication systems, to OFDMA in the next-generation communication system.

FIG. 1 illustrates a conventional cellular mobile communication system in which a transmit/receive antenna is placed at a center of each cell.

Referring to FIG. 1, the cellular mobile communication system the cellular mobile communication system includes three cells, i.e., a cell#1 100, a cell #2 110, and a cell#3 120. A specific UE receives a mobile communication service that is provided based on the above-described several methods, from a selected cell for a semi-static period.

Herein, it is assumed that cell#1 100 provides a mobile communication service to a UE#1 101 and a UE#2 102 located in the coverage area (or service area) of cell#1 100, cell#2 110 provides a mobile communication service to a UE#3 111, and cell#3 120 provides a mobile communication service to a UE#4 121. Transmit/receive antennas 130, 131, and 132 are placed at the centers of the cell#1 100, the cell#2 110, and the cell#3 120, respectively. For example, the transmit/receive antennas 130, 131, and 132 may correspond to ENBs or relays.

The UE#2 102, which receives a mobile communication service via cell#1 100, is located farther away from the antenna 130, than the UE#1 101. Further, the UE#2 102 suffers significant interference from the antenna 132 in cell#3 120, which is adjacent to cell#1 100. Therefore, the UE#2 102 is lower than the UE#1 101 in terms of a data rate supported by cell#1 100.

If mobile communication services are independently provided in cell#1 100 to cell#3 120, a Reference Signal (RS), which is used by a UE to measure a downlink channel status for each cell, is transmitted to the UE. For example, in a 3GPP LTE-A system, a UE receives a Channel Status Information-Reference Signal (CSI-RS) transmitted by an ENB, measures a channel status between the ENB and itself, based on the received CSI-RS, and feeds back channel status in a feedback mode determined by the ENB, at a timing that also determined by the ENB.

FIG. 2 illustrates resource positions of CSI-RSs transmitted from an ENB to a UE in a conventional LTE-A system.

Referring to FIG. 2, resources available in the LTE-A system are divided into the same-sized resource blocks, where the horizontal and vertical axes of the resources correspond to a time axis and a frequency axis, respectively.

Signals for two CSI-RS antenna portsare transmitted on resources of resource blocks 200 to 219. An ENB transmits two CSI-RSs for downlink measurement to a UE on the resources of the resource block 200.

For the cellular mobile communication system having a plurality of cells as illustrated in FIG. 1, a resource block having its own unique position is allocated for each cell, and a CSI-RS is transmitted on resources of the allocated resource block. For example, cell#1 100 transmits a CSI-RS on resources of resource block 200 in FIG. 2, and cell#2 110 transmits a CSI-RS on resources of resource block 205 in FIG. 2. Further, cell#3 120 transmits a CSI-RS on resources of resource block 210 in FIG. 2. By allocating resource blocks (i.e., time and frequency resources) for CSI-RS transmission in different positions for individual cells, it is possible to prevent CSI-RSs from different cells from interfering with each other.

In the cellular mobile communication system, a UE located at an edge of a cell has a limited high data rate support capacity because it suffers significant interference from adjacent other cells. More specifically, high data rates provided to UEs located in a cell are significantly affected by the locations of the UEs within the cell. Basically, in a conventional cellular mobile communication system, a UE located relatively closer to the center of a cell may transmit and receive data at a higher data ratet than a UE located relatively farther away from the center of a cell.

SUMMARY OF THE INVENTION

Accordingly, the present invention is designed to address at least the problems and/or disadvantages described above and to provide at least the advantages described below.

An aspect of the present invention is to provide a feedback generation method and apparatus for efficiently adjusting an amount of feedback information cooperatively transmitted in a CoMP system in which a plurality of ENBs cooperatively support downlink transmission for a UE.

In accordance with an aspect of the present invention, a method for reporting channel status by a UE in a communication system. Information on at least one channel status information reference signal is received from an evolved node B. A first channel status based on a first period and a first set of the at least one channel status information reference signal, is reported to the evolved node B. A second channel status based on a second period and a second set of the at least one channel status information reference signal, is reported to the evolved node B. The first channel status includes at least one of a precoding matrix indicator (PMI), a channel quality indicator (CQI), and a ranking indication (RI), and the second channel status includes at least one of a CQI, a PMI and a RI. The RI of the second channel status is same as the RI of the first channel status.

In accordance with another aspect of the present invention, a method is provided for receiving channel status by an evolved node B in a communication system. Information on at least one channel status information reference signal is transmitted to a UE. A first channel status reported based on a first period and a first set of the at least one channel status information reference signal, is received from the UE. A second channel status reported based on a second period and a second set of the at least one channel status information reference signal, is received from the UE. The first channel status includes at least one of a PMI, a CQI and a RI, and the second channel status includes at least one of a CQI, a PMI and a RI. The RI of the second channel status is same as the RI of the first channel status.

In accordance with another aspect of the present invention, a UE is provided for reporting channel status in a communication system. The UE includes a controller configured to control operations of a transmitter and a receiver. The UE also includes the receiver configured to receive information on at least one channel status information reference signal from an evolved node B. The UE also includes the transmitter configured to report a first channel status based on a first period and a first set of the at least one channel status information reference signal, to the evolved node B, and report a second channel status based on a second period and a second set of the at least one channel status information reference signal, to the evolved node B. The first channel status includes at least one of a PMI, a CQI and a RI, and the second channel status includes at least one of a CQI, a PMI and a RI. The RI of the second channel status is same as the RI of the first channel status.

In accordance with another aspect of the present invention, an evolved node B is provided for receiving channel status in a communication system. The evolved node B includes a controller configured to control operations of a transmitter and a receiver. The evolved node B also includes the transmitter configured to transmitting information on at least one channel status information reference signal to a UE. The evolved node B also includes the receiver configured to receive, from the UE, a first channel status reported based on a first period and a first set of the at least one channel status information reference signal, and to receive, from the UE, a second channel status reported based on a second period and a second set of the at least one channel status information reference signal. The first channel status includes at least one of a PMI, a CQI and a RI, and the second channel status includes at least one of a CQI, a PMI and a RI. The RI of the second channel status is same as the RI of the first channel status.

BRIEF DESCRIPTION OF THE DRAWINGS

The above and other aspects, features, and advantages of certain embodiments of the present invention will be more apparent from the following description when taken in conjunction with the accompanying drawings, in which.

Throughout the drawings, the same drawing reference numerals will be understood to refer to the same elements, features and structures.

DETAILED DESCRIPTION OF EMBODIMENTS OF THE INVENTION

Figure 1:
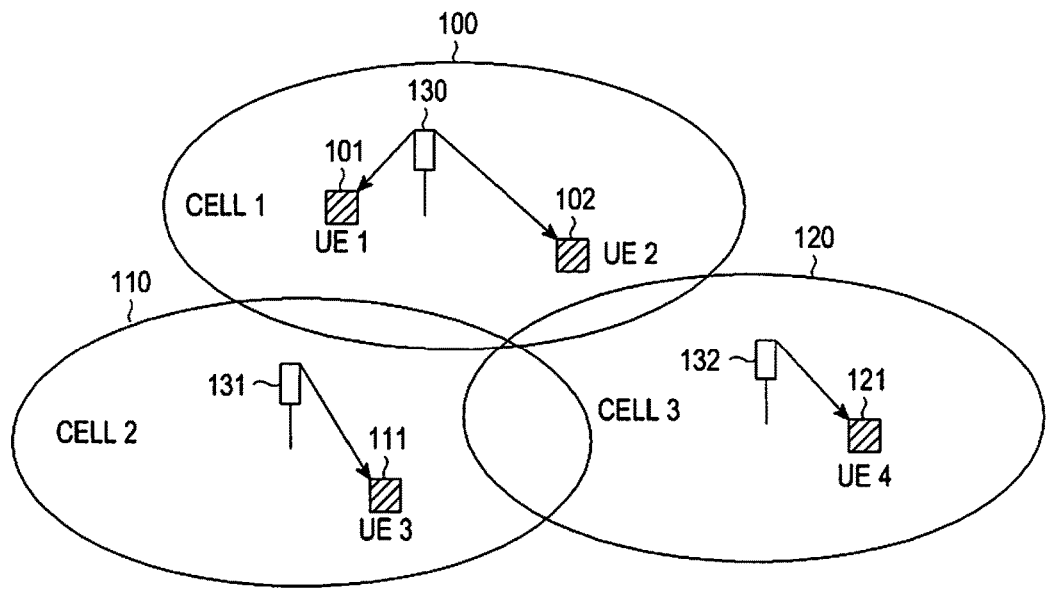
FIG. 1 illustrates a conventional cellular mobile communication system in which a transmit/receive antenna is placed at a center of each cell.
Figure 2:
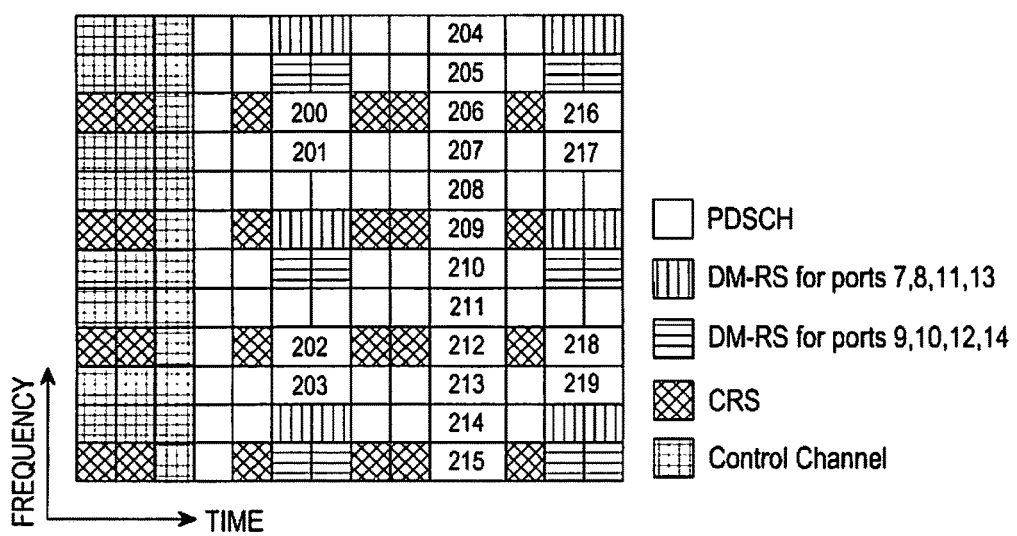
FIG. 2 illustrates positions of CSI-RSs transmitted from an ENB to a UE in a conventional LTE-A system.

Various embodiments of the present invention will now be described in detail herein below with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Although embodiments of the present invention will be described in detail below with reference to an OFDM wireless communication system, specifically, the 3GPP Evolved Universal Terrestrial Radio Access (EUTRA) standard, it will be apparent to those of ordinary skill in the art that the present invention is also applicable to other communication systems having similar technical backgrounds and channel formats, with slight modifications, without departing from the spirit and scope of the present invention.

A general cellular mobile communication system is accomplished by building a plurality of cells in a limited area. For each of the cells, an ENB in charge of mobile communication in the cell provides a mobile communication service to UEs located in the cell. A system in which a specific UE receives a mobile communication service only in one selected cell for a semi-static period is defined as a non-CoMP system.

In the non-CoMP system, a high data rate provided to a UE may dramatically vary depending on the location of the UE within the cell. More specifically, a UE located at the center of a cell uses a higher data rate than a UE located at an edge of the cell.

The opposite of the non-CoMP system is a CoMP system. In the CoMP system, a plurality of cells transmit data to a UE located at an edge of a cell in cooperation with each other (hereinafter referred to as "CoMP transmission") in order to support the UE. In this case, the CoMP system provides an improved mobile communication service, compared with the non-CoMP system.

In accordance with an embodiment of the present invention, a method and apparatus are provided for generating feedback information in the CoMP system, based on a Dynamic cell Blanking (DB) scheme and a Joint Transmission (JT) scheme. The DB scheme determines one or more cells, which act as large interference to UEs located in a plurality of cells, and prevents the determined cells from transmitting data in a specific time, thereby reducing the interference to the other remaining cells. In the JT scheme, a plurality of cells simultaneously transmit data to a specific UE.

Herein, a UE receiving data via a plurality of cells is referred to as a "CoMP UE", a UE receiving data via one cell situated closest to the UE is referred to as a "non-CoMP UE".

In accordance with another embodiment of the present invention the DB or JT scheme to be applied to, for example, an LTE-A system, efficiently adjusts an amount of feedback information using a threshold.

Figure 3:
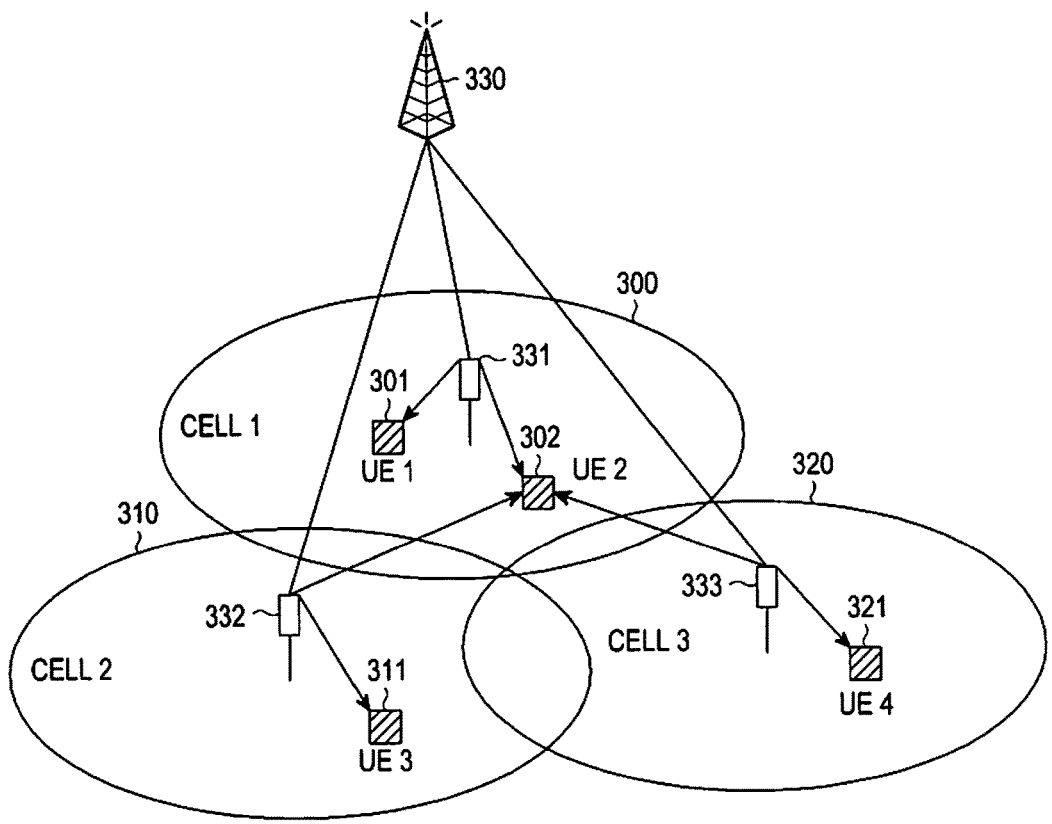
FIG. 3 illustrates a cellular mobile communication system according to an embodiment of the present invention.

FIG. 3 illustrates a cellular mobile communication system according to an embodiment of the present invention.

Referring to FIG. 3, the cellular mobile communication system includes three cells, i.e., cell#1 300, cell#2 310, and cell#3 320. Herein, the term cell refers to a data transmission area in which a UE can be served by a specific transmission point. For example, each transmission point may be a macro ENB located in an area of a macro cell, and a Remote Radio Head (RRH) having a cell ID in common. Otherwise, each transmission point may be macro cells or pico cells having different cell IDs.

A central control device 330 exchanges data with a UE and processes the exchanged data. If each transmission point is a macro ENB and an RRH having a cell ID in common, the macro ENB may be defined as the central control device 330. However, if each transmission point refers to macro cells or pico cells having different cell IDs, a device managing cell#1 300, cell#2 310, and cell#3 320 in an integrated manner may be defined as the central control device 330. Reference numerals 331, 332 and 333 represent transmit/receive antennas installed in cell#1 300, cell#2 310, and cell#3 320, respectively, which may be an ENB or a relay of their cells.

Referring to FIG. 3, cell#1 300, cell#2 310, and cell#3 320 include a non-CoMP UE#1 301, a non-CoMP UE#3 311, and a non-CoMP UE#4 321, each of which receives data via a cell located closest thereto. Cell#1 300, cell#2 310, and cell#3 320 also include a CoMP UE#2 302 that receives data via each of cell#1 300, cell#2 310, and cell#3 320.

Each of non-CoMP UE#1 301, non-CoMP UE#3 311, and non-CoMP UE#4 321 measures a channel status using a CSI-RS from its cell, and feeds back feedback information indicating estimation results to the central control device 330.

However, CoMP UE#2 302, which receives data via each of cell#1 300, cell#2 310, and cell#3 320, should estimate its channel status for each of cell#1 300, cell#2 310, and cell#3 320. Therefore, for channel estimation at the CoMP UE#2 302, the central control device 330 transmits three CSI-RSs corresponding to cell#1 300, cell#2 310, and cell#3 320, respectively, to the CoMP UE#2 302.

Figure 4:
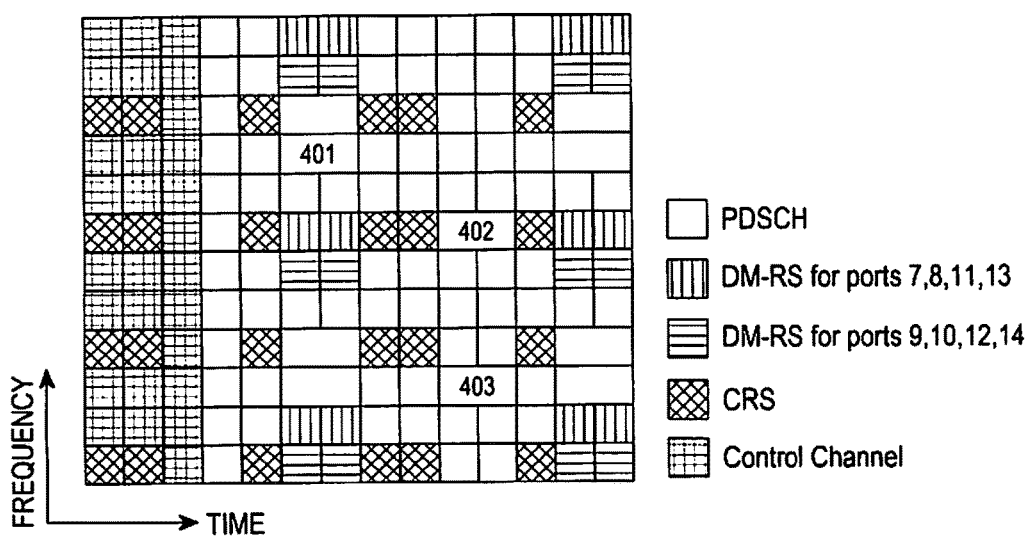
FIG. 4 illustrates an example of positions of CSI-RSs transmitted from an ENB to a UE according to an embodiment of the present invention.

FIG. 4 illustrates positions of CSI-RSs transmitted from an ENB to a UE according to an embodiment of the present invention. For convenience of description, the positions of CSI-RSs will be described with reference to the devices illustrated in FIG. 3.

Referring to FIG. 4, an ENB, i.e., the central control device 330, allocates CSI-RSs for cell#1 300, cell#2 310, and cell#3 320 to resource blocks 401, 402, and 403, such that the CoMP UE#2 302 may estimate its channels status for each of cell#1 300, cell#2 310, and cell#3 320. Thereafter, the central control device 330 transmits CSI-RSs using resources of the allocated resource blocks. For example, a CSI-RS for channel estimation of cell#1 300 is allocated to resource block 401, a CSI-RS for channel estimation of cell#2 310 is allocated to resource block 402, and a CSI-RS for channel estimation of cell#3 320 is allocated to resource block 403.

Herein, a feedback set refers to a set of resource blocks to which at least one CSI-RS transmitted for channel estimation of a CoMP UE is allocated.

Although in the CSI-RS allocation methods described herein, the central control device 330 is assumed to know all of cell IDs of the cells that perform CoMP transmission, it should be noted that the present invention is not limited thereto. In an alternative embodiment of the present invention, if the central control device 330 does not know all of cell IDs of the cells that perform CoMP transmission, the cells performing CoMP transmission may share cell IDs and positions of resource blocks to which their CSI-RSs are allocated, such that CSI-RSs of all the cells performing CoMP transmission may be transmitted to the CoMP UE.

Figure 5:
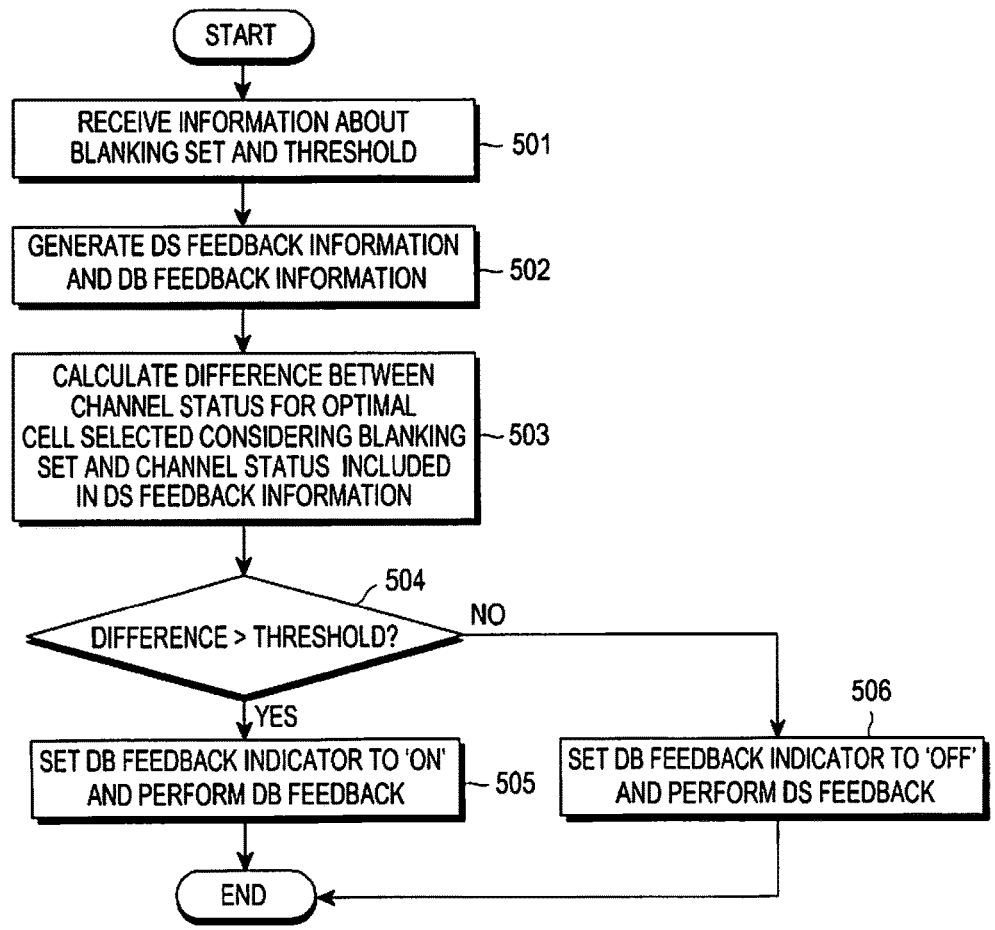
FIG. 5 is a flowchart illustrating a method of a UE in a cellular mobile communication system using a Dynamic cell Blanking (DB) scheme according to an embodiment of the present invention.

FIG. 5 illustrates an operation of a UE in a cellular mobile communication system using a DB scheme according to an embodiment of the present invention.

Referring to FIG. 5, the UE receives information about a blanking set and a threshold from a central control device in step 501. For example, the central control device is an ENB of a cell where the UE is located. The threshold is a value for adjusting an amount of feedback to be transmitted, based on the blanking set. The blanking set includes CSI-RSs corresponding to cells, from which the UE may stop data reception at a specific time.

The central control device, based on the DB scheme includes, in a blanking set, one or more cells determined to act as higher interference to a plurality of cells, and provides information about the blanking set to the UE.

For example, if a set (hereinafter referred to as a "feedback set") having, as its elements, CSI-RSs corresponding to the cells, of which channel status the UE will measure, is {1, 2, 3}, then a blanking set is {1}, which is obtained from the information about the blanking set that the UE has received from the central control device. Indexes indicating elements constituting the feedback set and the blanking set correspond to CSI-RSs constituting the feedback set on a one-to-one basis. The indexes of cell#1, cell#2, and cell#3 are "1", "2", and "3", respectively.

Although the blanking set includes only one value, it will be apparent to those of ordinary skill in the art that an embodiment of the present invention may be applied to scenarios where the blanking set includes more than one value.

Accordingly, the UE receives information about the feedback set from the central control device 330, measures its channel status based on the received information, generates feedback information, and recognizes that the total number of cells to which it will transmit the feedback information is three, i.e., cell#1, cell#2, and cell#3. If the blanking set is, for example, {1}, which is obtained from the information about the blanking set that the UE has received from the central control device 330, then the UE recognizes that it may stop data reception from cell#1 Herein, an operation of stopping data reception from the cell is referred to as "powering off".

For example, assuming that a feedback set is {1, 2, 3, 4, 5, 6} and blanking sets are {1, 2} and {3, 4}, which are obtained from information about the blanking set that the UE has received from the central control device 330, the UE recognizes that the total number of cells for which it should generate feedback by measuring the channel status is six. Further, UE recognizes that cell#1 and cell#2 may be simultaneously powered off, or that cell#3 and cell#4 may be simultaneously powered off.

In step 502, the UE determines an optimal cell, based on the channel statuses of the cells. Thereafter, the UE generates channel information (hereinafter referred to as "Dynamic Selection (DS) feedback information") for the determined optimal cell. For example, Channel Quality Information (CQI) or Signal-to-Interference Ratio (SINR) may be used as information about the channel status.

After assuming that each of the cells in the blanking set obtained from the information about the blanking set is powered off, the UE determines the optimal cell based on the channel statuses of the remaining cells, i.e., all the cells included in the feedback set except for the powered-off cells, and generates channel information (hereinafter referred to as "DB feedback information") for the determined optimal cell.

For example, in accordance with an embodiment of the present invention, an SINR is used to determine the optimal cell corresponding to the DS feedback information or the DB feedback information. In this case, the UE determines the optimal cell for DS feedback and DB feedback using Equation (1) and Equation (2) below.

$$i^* = \arg \max_i [SINR(R_i, \Sigma_{j \in M} R_j) + f(\text{offset}_i)] \quad (1)$$

$$i^*_k = \arg \max_i [SINR(R_i, \Sigma_{j \in M \setminus \{blanking\_set\_k, i\}} R_j) + f(\text{offset}_i)] \quad (2)$$

In Equation (1), SINR(A,B) is an SINR calculation function that has, as its inputs, a receive channel A for a signal and a receive channel B for interference. The receive channel A for a signal is expressed as $R_i$, which represents a receive channel of a signal transmitted from an i-th cell. The receive channel B for interference is expressed as $\Sigma_{j \in M \setminus (i)} R_j$. In Equation (2), $\Sigma_{j \in M \setminus \{blanking\_set\_k, i\}} R_j$ represents a receive channel of the cells included in the feedback set except for the cells included in the blanking set. M represents a feedback set.

In Equation (1) and Equation (2), $f$ represents a function of converting information $\text{offset}_i$, which is for a particular situation, such as traffic in the cell, and is received from the ENB, into an SINR value.

In step 503, the UE calculates a difference between a channel status for the optimal cell (included in the DB feedback information) selected considering the blanking set and a channel status for the optimal cell (included in the DS feedback information) selected considering all cells included in the feedback set. The operation in step 503 will be described in more detail below with reference to FIG. 7 or FIG. 8.

In step 504, the UE compares the difference with the threshold. If the difference exceeds the threshold, the UE sets a DB feedback indicator to 'ON', and transmits the DB feedback information together with the DB feedback indicator in step 505. For example, the DB feedback information includes a cell index and channel information for the optimal cell selected based on channel statuses of remaining cells, on the assumption that the cells included in the blanking set are powered off.

However, if the difference is less than or equal to the threshold in step 504, the UE sets the DB feedback indicator to 'OFF' and feeds back the DS feedback information in step 506. For example, the DS feedback information includes a cell index and channel information for each of the optimal cells selected based on channel statuses of the all cells, if all the cells are powered on.

When based on an LTE-A system, a method, in which a UE transmits DS feedback information or DB feedback information to the central control device 330, includes a periodic feedback method and an aperiodic feedback method. In the periodic feedback method, channel information is periodically fed back over a Physical Uplink Control Channel (PUCCH). In the aperiodic feedback method, channel information is aperiodically fed back over a Physical Uplink Shared Channel (PUSCH).

A UE that uses the periodic feedback method may transmit feedback information for the optimal cell among all the cells which are included in the feedback set in a predetermined order, while all the cells are powered on, and may transmit feedback information for the optimal cell selected based on the cells included in each of at least one blanking set that the UE has recognized.

Figure 6:
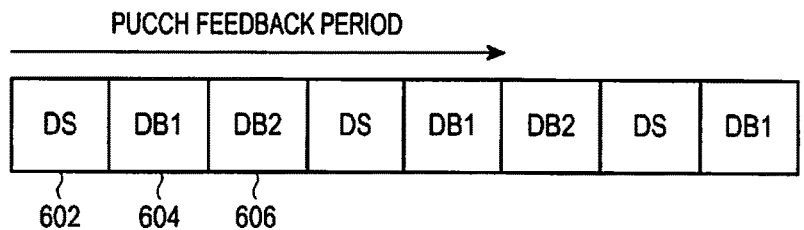
FIG. 6 illustrates timings for UE periodic feedback in a cellular mobile communication system using a DB scheme according to an embodiment of the present invention.

FIG. 6 illustrates timings for UE periodic feedback in a cellular mobile communication system using a DB scheme according to an embodiment of the present invention.

In FIG. 6, it is assumed that there are two blanking sets. Further, in the periodic feedback method, the UE transmits feedback information in an order of DS feedback information (indicated as DS), DB feedback information (indicated as DB1) generated based on a first blanking set among the two blanking sets, and DB feedback information (indicated as DB2) generated based on a second blanking set among the two blanking sets.

Referring to FIG. 6, in a first PUCCH feedback period 602, the UE generates and transmits DS feedback information including a cell index and channel status information for the optimal cell that the UE selected based on a channel status for each of the cells included in a feedback set, while the cells are powered on.

In a second PUCCH feedback period 604, assuming that the cells included in the first blanking set are powered off, the UE selects the optimal cell from among the remaining cells, i.e., except for the powered-off cells among all the cells, and feeds back DB feedback information including a cell index and channel status information for the selected optimal cell.

In a third PUCCH feedback period 606, assuming that the cells included in the second blanking set are powered off, the UE selects the optimal cell from among the remaining cells except for the powered-off cells, and generates and feeds back DB feedback information including a cell index and channel status information for the selected optimal cell. Thereafter, the UE repeats the process.

In FIG. 6, it is assumed that the PUCCH feedback periods 604 and 606 for transmitting DB feedback information are sequentially set after the PUCCH feedback period 602 for transmitting DS feedback information, by way of example. However, in an alternative embodiment of the present invention, individual PUCCH feedback periods for feeding back DB feedback information and DS feedback information may be independently set. Further, if two PUCCH feedback periods for feeding back DB feedback information and the DS feedback information conflict with each other, the PUCCH feedback period for transmitting the DS feedback information supporting the basic operation may be set to have the higher priority.

In accordance with an embodiment of the present invention, e.g., as described above with reference to steps 504 to 506 of FIG. 5, the UE compares a difference between the channel status for the optimal cell, which is included in the DB feedback information, and the channel status for the optimal cell, which is included in the DS feedback information, with a threshold. Various values indicating the channel status, such as CQI and SINR, may be used as the channel status. The UE feeds back the DB feedback information if the difference exceeds the threshold. Otherwise, the UE determines the priority feedback by feeding back the DS feedback information.

The threshold, a value transmitted by the ENB transmitted, e.g., as in step 501 of FIG. 5, may be defined as a sum of CQIs for individual codewords for the DS scheme and the DB scheme, or defined as a SINR value for the DS scheme and the DB scheme.

Figure 7:
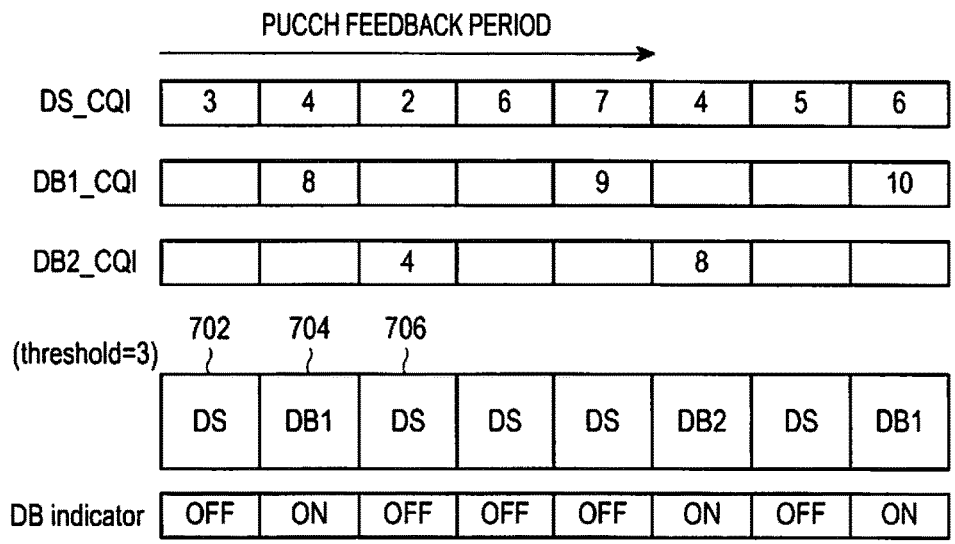
FIG. 7 illustrates timings for UE periodic feedback in a cellular mobile communication system using a DB scheme according to an embodiment of the present invention.

FIG. 7 illustrates timings for UE periodic feedback in a cellular mobile communication system using a DB scheme according to an embodiment of the present invention. In FIG. 7, it is assumed that a sum of the CQIs is used as a channel status and a threshold, and there are two blanking sets.

Referring to FIG. 7, in a first PUCCH feedback period 702, a UE selects the optimal cell considering channel statuses for each of the cells included in a feedback set, while each of the cells is powered on. The UE generates and feeds back DS feedback information (DS) including a cell index and a channel status for the selected optimal cell.

In a second PUCCH feedback period 704, assuming that the cells included in the first blanking set among the two blanking sets are powered off, the UE selects the optimal cell based on channel statuses for the remaining cells, i.e., the cells included in the feedback set except for the powered-off cells in the first blanking set. The UE generates DB feedback information (DB1) including a cell index and channel status for the selected optimal cell.

In the second PUCCH feedback period 704, the UE selects the optimal cell based on channel statuses for each cell included in the feedback set, while all the cells are powered on. The UE generates DS feedback information including a cell index and a channel status for the selected optimal cell.

In the second PUCCH feedback period 704, the UE compares a difference between the channel status for the optimal cell, which is included in the DB feedback information DB1 and the channel status for the optimal cell, which is included in the DS feedback information, with the threshold. If the difference exceeds the threshold, the UE transmits or feeds back the DB feedback information DB1. However, if the difference is less than or equal to the threshold, the UE transmits or feeds back the DS feedback information.

In FIG. 7, it is assumed that the channel status for the cells is represented by a sum of the CQIs, and the threshold that the UE received from the ENB in step 501 is "CQI=3". In the second PUCCH feedback period 704, the UE compares a difference between the DB feedback information DB1 of "CQI=8" and the DS feedback information of "CQI=4", with the threshold of "CQI=3". Because the difference, i.e., "CQI=4", exceeds the threshold, the UE feeds back the DB feedback information DB1 in the second PUCCH feedback period 704.

In a third PUCCH feedback period 706, assuming that the cells included in the second blanking set among the two blanking sets are powered off, the UE generates DB feedback information (DB2) including a cell index and a channel status for the optimal cell that is selected based on channel statuses for the cells, except for the powered-off cells.

In the third PUCCH feedback period 706, the UE selects the optimal cell based on channel statuses for the cells included in the feedback set while all of the cells are powered on. The UE generates DS feedback information including a cell index and a channel status for the selected optimal cell.

In the third PUCCH feedback period 706, the UE compares a difference between the channel status for the optimal cell, which is included in the DB feedback information DB2, and the channel status for the optimal cell, which is included in the DS feedback information, with the threshold.

More specifically, the UE compares a difference between the DB feedback information DB2 of "CQI=4" and the DS feedback information of "CQI=2" in the third PUCCH feedback period 706, with the threshold of "CQI=2". Because the difference, i.e., "CQI=2", is less than or equal to the threshold, the UE feeds back the DS feedback information in the third PUCCH feedback period 706. Thereafter, the UE repeats the above-described process.

In each PUCCH feedback period, the UE sets a DB feedback indicator indicating whether it feeds back the DB feedback information. Specifically, when feeding back the DB feedback information, the UE sets the DB feedback indicator to "ON", and transmits the DB feedback indicator to the ENB together with the DB feedback information. Similarly, when feeding back the DS feedback information, the UE sets the DB feedback indicator to "OFF", and transmits the DB feedback indicator to the ENB together with the DS feedback information.

Figure 8:
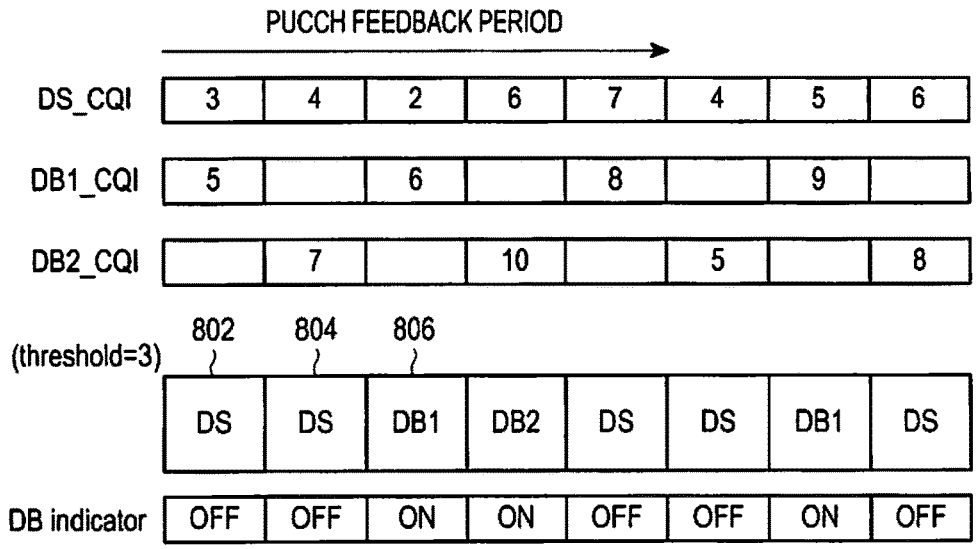
FIG. 8 illustrates timings for UE periodic feedback in a cellular mobile communication system using a DB scheme according to an embodiment of the present invention.

FIG. 8 illustrates timings for UE periodic feedback in a cellular mobile communication system using a DB scheme according to an embodiment of the present invention. In FIG. 8, it is assumed that a sum of the CQIs is used as a channel status and a threshold, and that there are two blanking sets.

Referring to FIG. 8, in a first PUCCH feedback period 802, the UE selects the optimal cell based on channel statuses for all of the cells powered on. The UE generates DS feedback information (DS) including a cell index and channel status information for the optimal cell. Further, assuming that the cells included in the first blanking set among the two blanking sets are powered off, the UE selects the optimal cell among the remaining cells, i.e., the cells included in the feedback set except for the powered-off, based on channel statuses for the remaining cells. The UE generates DB feedback information (DB1) including a cell index and channel status information for the selected optimal cell. The UE compares a difference between the DS feedback information DS and the DB feedback information DB1, with a threshold. Because the difference of "CQI=2" between the DS feedback information DS of "CQI=3" and the DB feedback information of "CQI=5" is less than or equal to the threshold of "CQI=3", the UE feeds back the DS feedback information DS in the first PUCCH feedback period 802. If, however, the difference exceeds the threshold, the UE feeds back the DB feedback information DB1 in the first PUCCH feedback period 802.

In the second PUCCH feedback period 804, the UE selects the optimal cell based on the channel statuses of all of the cells included in the feedback set powered on. The UE generates DS feedback information including a cell index and a channel status for the selected optimal cell. Assuming that the cells included in the second blanking set among the two blanking sets are powered off, the UE selects the optimal cell among the remaining cells, considering channel statuses for the remaining cells. The UE generates DB feedback information DB2 including a cell index and a channel status for the optimal cell.

The UE compares a difference of "CQI=3" between the DS feedback information of "CQI=4" and the DB feedback information DB2 of "CQI=7", with a threshold of "CQI=3". Because the difference is the same as the threshold, the UE feeds back the DS feedback information in the second PUCCH feedback period 804, and repeats the above-described process in the remaining PUCCH feedback periods.

In a DB feedback transmission period among the PUCCH feedback periods, the UE transmits, to the ENB, a DB feedback indicator, which is set to "ON", with the DB feedback information. In the DS feedback transmission period among the PUCCH feedback periods, the UE transmits, to the ENB, a DB feedback indicator, which is set to "OFF", with the DS feedback information.

The above-described method of comparing a difference between channel status information for the optimal cell that is selected considering channel statuses of all cells included in a feedback set and channel status information for the optimal cell that is selected from among the remaining cells based on channel statuses of the remaining cells on the assumption that the cells included in the blanking set are powered off, with a threshold, determining whether to transmit DS feedback information or transmit DB feedback information generated in association with the blanking set based on the comparison results, and feeding back the determined feedback information, enables the UE to more accurately reflect the channel status during feedback, as compared with a method wherein the UE performs feedback depending on feedback timings for predetermined DB feedback information or feedback timings for DS feedback information.

Figure 9:
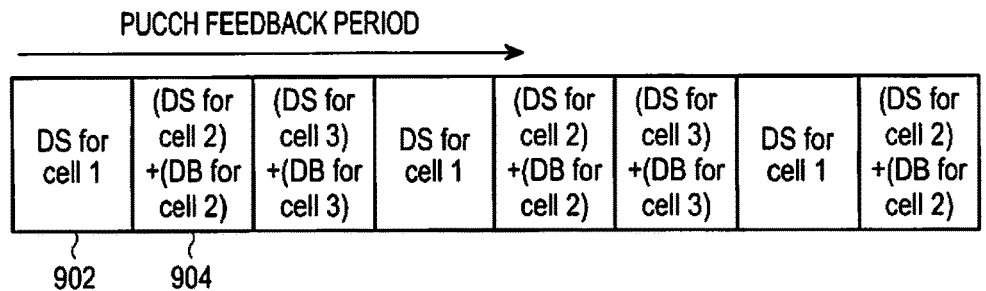
FIG. 9 illustrates timings for UE periodic feedback in a cellular mobile communication system using a DB scheme according to an embodiment of the present invention.

FIG. 9 illustrates timings for UE periodic feedback in a cellular mobile communication system using a DB scheme according to an embodiment of the present invention. In FIG. 9, it is assumed that the UE performs DS feedback to each of a plurality of cells.

More specifically, the UE determines whether the DB feedback information to be transmitted in the same feedback period as that of the DS feedback information has information that is different from the information included in the DS feedback information to be transmitted in the same feedback period. Depending on the comparison results, the UE determines the information with which it will compose DB feedback information. In this case, the DS feedback information may optionally include a cell index of the optimal cell. If it is determined that the DB feedback information to be transmitted in the same feedback period has information that is different from the information included in the DS feedback information to be transmitted in the same feedback period, the DB feedback information may be fed back by being composed of only the different information.

Referring to FIG. 9, a feedback set is {1, 2, 3} and a blanking set is {1}.

In a first PUCCH feedback period 902, the UE feeds back DS feedback information (DS) for cell#1. In this case, because cell#1 falls within the blanking set, the DS feedback information may include cell status information (e.g., Ranking Indication (RI), Precoding Matrix Indication (PMI), and CQI) for cell#1.

In a second PUCCH feedback period 904, the UE transmits DB feedback information and DS feedback information for cell#2. The DB feedback information for cell#2 is generated based on the channel status for cell#2, when cell#1 is powered off. In this case, the DB feedback information for cell#2 may be configured to include the information that is different from the DS feedback information for cell#2.

For example, the DS feedback information for cell#2 may be configured to include an RI, a PMI, and CQI included in the DS feedback information for cell#2, and differences between the RI, PMI and CQI included in the DS feedback information for cell#2 and the RI, PMI and CQI included in the DB feedback information for cell#2.

As another example, the DB feedback information for the cell#2 may be generated to include the intact RI and PMI included in the DS feedback information for cell#2, when cell#1 is powered off, and to include only a difference between the CQI included in the DS feedback information for the cell#2 and the CQI included in the DB feedback information for cell#2, only for the CQI.

Although not illustrated in FIG. 9, the UE may compare a difference between channel status information included in the DS feedback information and the channel status information included in the DB feedback information, which is calculated in each PUCCH feedback period, with a threshold, and then determine whether to transmit the DB feedback information depending on the comparison results.

In addition, although a UE feedback operation may use a predetermined order, as in the PUCCH using the aperiodic feedback method on a PUSCH, the present invention is not limited thereto. Specifically, the UE may designate on which blanking set it will perform feedback, using a Physical Downlink Control Channel (PDCCH) including a field for activating aperiodic feedback. For example, if aperiodic feedback is activated and feedback for a specific blanking set is designated in control information transmitted on a PDCCH channel, the UE performs aperiodic feedback on the specific blanking set, on the PUSCH based on the control information.

In accordance with an embodiment of the present invention, a method of designating feedback includes a method in which feedback for one or more blanking sets is designated in a PDCCH. Also, both DS feedback and DB feedback may be designated to be performed at the same time in the feedback timing where aperiodic feedback is activated.

Although in an embodiment of the present invention, the DB scheme is considered by default, which is one of the CoMP technologies for preventing one or more cells determined to act as large interference to a plurality of cells from transmitting data at a specific time, for the remaining cells, it should be noted that the present invention is not limited thereto. For the JT scheme, one of the CoMP technologies, in which a plurality of cells simultaneously transmit data to a specific UE, a UE, unlike the non-CoMP UE, should transmit additional feedback information to the ENB. Therefore, when performing feedback for the JT scheme, the UE determines whether feedback information is valid, based on the threshold, and then feeds back or transmits an indicator including the validity information to the ENB together with the feedback information.

In addition, in accordance with an embodiment of the present invention, a feedback operation for the basic downlink operation and a feedback operation for performing an additional operation may be separated even in the non-CoMP technology, and the UE may determine validity of the additional feedback operation based on the threshold provided by the ENB, and transmit feedback information including an indicator indicating the validity of the additional feedback.

Figure 10:
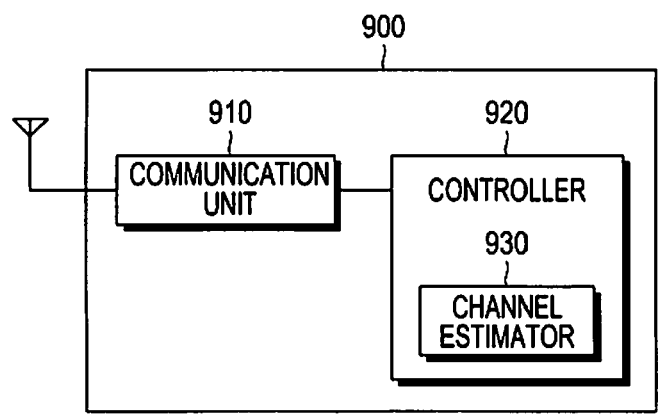
FIG. 10 illustrates a UE according to an embodiment of the present invention.

FIG. 10 illustrates a UE according to an embodiment of the present invention.

Referring to FIG. 10, a UE 900 includes a communication unit 910 and a controller 920. The communication unit 910 transmits and receives data, and transmits channel information for an optimal cell to a central control device under control of the controller 920.

The controller 920 controls statuses and operations of all components included in the terminal 900, in accordance with the methods described with reference to FIGS. 3 to 9. The controller 920 selects the optimal cell depending on its communication status with the adjacent cells, and controls the communication unit 910 to feed back channel information for the selected optimal cell to the central control device. To this end, the controller 920 further includes a channel estimator 930.

The channel estimator 930 estimates a channel based on CSI-RSs received from the central control device. The channel estimator 930 selects the optimal cell based on the estimated channel, and controls the communication unit 910 to feed back a cell index and channel information for the selected optimal cell to the central control device.

More specifically, the channel estimator 930 estimates a channel status for each of the cells included in a feedback set and corresponding to CSI-RSs. The channel estimator 930 selects the optimal cell by calculating an SINR for each cell on the assumption that all of the cells included in the feedback set corresponding to the CSI-RSs are powered on.

Further, assuming the cells included in a blanking set and corresponding to the CSI-RSs are powered off, the channel estimator 930 calculates an SINR for each of the remaining cells, i.e., all of the cells included in the feedback set except for the powered-off cells. The channel estimator 930 selects the optimal cell from among the remaining cells. Thereafter, the channel estimator 930 controls the communication unit 910 to feed back, to the central control device, DS feedback information including a cell index and channel status information of the optimal cell that is selected while all the cells are powered on, DB feedback information including a cell index and channel status information for each optimal cell that is selected while the cells included in the blanking set are powered off, and a DB indicator indicating whether the DB feedback information is fed back.

Although the UE includes the communication unit 910 and the controller 920, it should be noted that the present invention is not limited thereto. Alternatively, a UE in accordance with an embodiment of the present invention may include additional components for a variety of functions performed in the UE. For example, the UE may further include a display for displaying the current status of the UE, an input unit for receiving signals such as function execution signals from the user, and a storage for storing generated data.

Figure 11:
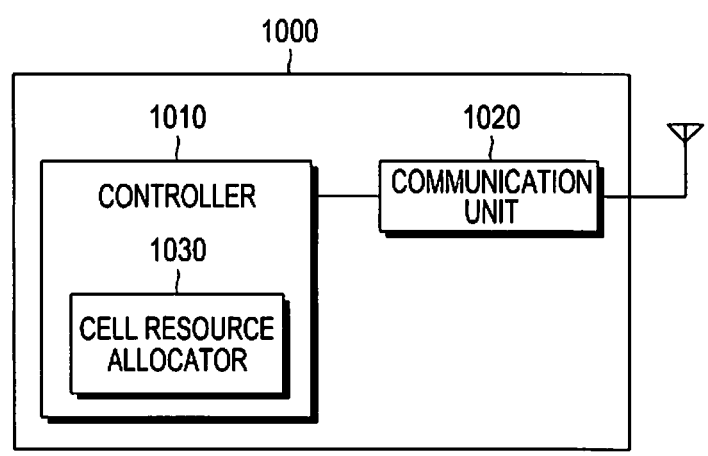
FIG. 11 illustrates a central control device according to an embodiment of the present invention.

FIG. 11 illustrates a central control device according to an embodiment of the present invention.

Referring to FIG. 11, a central control device 1000 includes a controller 1010 and a communication unit 1020. The controller 1010 controls statuses and operations of all components included in the central control device 1000, in accordance with the methods described with reference to FIGS. 3 to 9 above. The controller 1010 allocates CSI-RS for each cell to associated resources, determines cells included in a blanking set and a threshold for transmitting any one of DB feedback and DS feedback, and then informs the UE of the resource positions and information. For this operation, the controller 1010 includes a cell resource allocator 1030.

The cell resource allocator 1030 allocates a CSI-RS corresponding to each cell to each cell so that a CoMP UE may estimate a channel for each cell, and transmits the CSI-RS to the UE using the allocated resources. The resource allocated for each cell is allocated to correspond to a CSI-RS for channel estimation of each cell, e.g., as illustrated in FIG. 4.

The communication unit 1020 performs a general function of transmitting and receiving data with the UE or the cells managed by the central control device 1000. The communication unit 1020 transmits CSI-RSs to the UE on the allocated resources and receives feedback for channel information from the UE, under control of the controller 1010.

As is apparent from the foregoing description, in a CoMP system in which a plurality of ENBs cooperatively support downlink transmission for a UE based on the LTE-A system, a UE provided by the present invention generates feedback information considering a DB scheme and a JT scheme, compares a difference between a channel status for the cells included in a feedback set and a channel status for the cells included in a blanking set, with a threshold, and adjusts the amount of feedback information depending on the comparison results. As a result the UE is able to more accurately reflect its channel status during feedback.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method for reporting channel status by a user equipment (UE) in a communication system, the method comprising:
   receiving information for a plurality of channel status information (CSI)-reference signals (RSs), the plurality of CSI-RSs including at least one CSI RS for channel measurement and at least one power off CSI RS;
   reporting, to an evolved node B, a first feedback for a cell based on a first set among the plurality of CSI-RSs, the first feedback including at least one of a precoding matrix indicator (PMI), a channel quality indicator (CQI), and a ranking indication (RI); and
   reporting, to the evolved node B, a second feedback for the cell based on a second set among the plurality of CSI-RSs, the second feedback including at least one of a PMI, a CQI, and an RI,
   wherein at least one of the first set and the second set includes the at least one CSI RS for channel measurement and the at least one power off CSI RS, and
   wherein the RI of the second feedback is same as the RI of the first feedback.

2. The method of claim 1, wherein the first feedback and the second feedback are reported on one subframe.

3. The method of claim 1, wherein a first period for the first feedback and a second period for the second feedback are configured respectively.

4. A method for receiving channel status by an evolved node B in a communication system, the method comprising:
   transmitting information for a plurality of channel status information (CSI)-reference signals (RSs), the plurality of CSI-RSs including at least one CSI RS for channel measurement and at least one power off CSI RS;
   receiving, from a user equipment (UE), a first feedback for a cell based on a first set among the plurality of CSI-RSs, the first feedback including at least one of a precoding matrix indicator (PMI), a channel quality indicator (CQI), and a ranking indication (RI); and
   receiving, from the UE, a second feedback for the cell based on a second set among the plurality of CSI-RSs, the second feedback including at least one of a PMI, a CQI, and an RI,
   wherein at least one of the first set and the second set includes the at least one CSI RS for channel measurement and the at least one power off CSI RS, and
   wherein the RI of the second feedback is same as the RI of the first feedback.

5. The method of claim 4, wherein the first feedback and the second feedback are reported on one subframe.

6. The method of claim 4, wherein a first period for the first feedback and a second period for the second feedback are configured respectively.

7. A user equipment (UE) for reporting channel status in a communication system, the UE comprising:
   a transmitter;
   a receiver; and
   a controller configured to:
      control the receiver to receive information for a plurality of channel status information (CSI)-reference signals (RSs), the plurality of CSI-RSs including at least one CSI RS for channel measurement and at least one power off CSI RS, and
      control the transmitter to:
         report, to an evolved node B, a first feedback for a cell based on a first set among the plurality of CSI-RSs, the first feedback including at least one of a precoding matrix indicator (PMI), a channel quality indicator (CQI), and a ranking indication (RI), and
         report, to the evolved node B, a second feedback for the cell based on a second set among the plurality of CSI-RSs, the second feedback including at least one of a PMI, a CQI, and an RI,
      wherein at least one of the first set and the second set includes the at least one CSI RS for channel measurement and the at least one power off CSI RS, and
      wherein the RI of the second feedback is same as the RI of the first feedback.

8. The UE of claim 7, wherein the first feedback and the second feedback are reported on one subframe.

9. The UE of claim 7, wherein a first period for the first feedback and a second period for the second feedback are configured respectively.

10. An evolved node B for receiving channel status in a communication system, the evolved node B comprising:
    a transmitter;
    a receiver; and
    a controller configured to:
       control the transmitter to transmit information for a plurality of channel status information (CSI)-reference signals (RSs), the plurality of CSI-RSs including at least one CSI RS for channel measurement and at least one power off CSI RS, and
       control the receiver to:
          receive, from a user equipment (UE), a first feedback for a cell based on a first set among the plurality of CSI-RSs, the first feedback including at least one of a precoding matrix indicator (PMI), a channel quality indicator (CQI), and a ranking indication (RI), and
          receive, from the UE, a second feedback for the cell based on a second set among the plurality of CSI-RSs, the second feedback including at least one of a PMI, a CQI, and an RI,
       wherein at least one of the first set and the second set includes the at least one CSI RS for channel measurement and the at least one power off CSI RS, and
       wherein the RI of the second feedback is same as the RI of the first feedback.

11. The evolved node B of claim 10, wherein the first feedback and the second feedback are reported on one subframe.

12. The evolved node B of claim 10, wherein a first period for the first feedback and a second period for the second feedback are configured respectively.

* * * * *